United States Patent [19]

Lochmann et al.

[11] Patent Number: 4,475,038
[45] Date of Patent: Oct. 2, 1984

[54] IN SITU LITHOLOGY DETERMINATION

[76] Inventors: Mark J. Lochmann, 1801 Matador St., Abilene, Tex. 79605; Robert C. Ivey, 1725 Westwood St., Abilene, Tex. 79603

[21] Appl. No.: 369,256

[22] Filed: Apr. 16, 1982

[51] Int. Cl.³ .............................................. G01V 5/00
[52] U.S. Cl. .................................................. 250/270
[58] Field of Search ................ 250/256, 269, 270, 264

[56] References Cited

U.S. PATENT DOCUMENTS

| | | | |
|---|---|---|---|
| 2,830,185 | 4/1958 | Scherbatskoy | 250/264 |
| 3,294,972 | 12/1966 | Youmans | 250/270 |
| 3,925,659 | 12/1975 | Paap et al. | 250/270 |
| 4,390,783 | 6/1983 | Grau | 250/270 |
| 4,394,574 | 7/1983 | Grau et al. | 250/270 |

Primary Examiner—Janice A. Howell
Attorney, Agent, or Firm—Christie, Parker & Hale

[57] ABSTRACT

A method for enhancing neutron induced gamma ray logging records includes generating a baseline signal which represents compton scattering noise and obtaining a difference signal by subtracting the baseline signal from the data signal. The noise reduced difference signal is calibrated to obtain abundances of elements in a rock formation. A lithology is determined by in situ measurement by using the noise reduced logging records to obtain abundances of individual elements which are used to correct water saturation and porosity and obtain mineral compositions.

32 Claims, 7 Drawing Figures

IN SITU LITHOLOGY DETERMINATION

FIELD OF THE INVENTION

This invention relates to procedures for generating lithologic logs of subterranean rock formations from in situ measurement, and to enhancing spectral data taken from neutron logging devices.

BACKGROUND OF THE INVENTION

Granite wash reservoirs in Oklahoma, Texas, Colorado and New Mexico have proven to be effective commercial producers of hydrocarbons. The granite wash, an arkose, consists of many localized potential reservoirs which vary greatly in thickness and lithology. An arkose is defined as a sandstone containing 25% or more of feldspar usually derived from the disintegration of acid igneous rocks of granitoid texture. Commercially productive zones consisting of quartz, feldspar, calcite, mica and clay mixtures exhibit typical reservoir characteristics such as adequate permeability, low clay content and sufficient porosity.

In order to correctly evaluate the potential of a rock formation, it is necessary to obtain a lithologic profile. Many rock formations, such as granite wash, are complex. The composition at any interval is typically a function of many variables. Logging tools, such as neutron logs, density logs, and resistivity logs, and other indirect measurements have been used to measure various characteristics of rock formations in attempts to determine crude lithology.

Lithologic changes in rock formations affect the responses of standard logging tools in different ways. It has previously been considered impossible to obtain a precise lithology from logging tools alone, except for two member systems having a known fluid content. In order to evaluate more complex rock formations, it has been necessary to make assumptions about the logging tool responses which have been extrapolated from experience in simple systems. Unfortunately, as with any assumption, inaccurate evaluations occur. Consequently, productive zones are often overlooked, and nonproductive zones are confused with highly productive ones.

In order to determine lithology, the specific amounts of certain elements in the rock formation must be known. This information can be obtained by physically removing a sample of rock from a formation and returning it to the surface for analysis. The most common techniques available for doing this are cuttings, sidewall coring, and conventional coring.

Rock cuttings are ten-foot samples taken of the rock formation which are circulated to the surface by the drilling fluid (mud) system where they can be examined in the field or sent to a laboratory. This approach is limited in that serious problems such as lag time, contamination and sloughing frequently occur. In addition, due to the heterogenous nature of complex reservoirs, mere ten foot samples may not be representative of the interval in question.

Sidewall coring is also available. With this method, operators select specific intervals to be sampled, which are taken from the side of the borehole and returned to the surface for evaluation. High compressive strength formations make sidewall cores difficult to recover and their cost is moderate to high considering the number of intervals which need to be adequately tested.

Conventional coring yields the most complete information on cores brought to the surface. The core will indicate lithology, porosity, permeability, and so forth. Unfortunately, coring is the most expensive method available. Hence coring the entire well is certainly impractical. As a result, geologists and engineers must designate the intervals to be tested while drilling. This has been difficult as there is little information available about any given rock formation. If the core is taken too early, it will need to be repeated further down the borehole, increasing the cost. On the other hand, a late core will miss the productive zone. All too frequently, coring results in recovery of shale sections or other unwanted zones.

In each of the above methods, samples must be physically removed from the formation and returned to the surface for evaluation. It would be desirable to develop a method for accurate lithologic determination using in situ measurement.

A technique of spectral analysis of rock formations is relatively new and has not yet achieved widespread field application. Spectral analysis involves the interpretation of spectra obtained from rock formations using logging tools including a passive gamma ray detector and a neutron induced gamma ray log. In the latter tool, a neutron source is placed alongside the formation and periodically emits bursts of high energy neutrons to excite the atoms in the formation. A detector records the number of counts of returning gamma rays and segregates them according to their energies.

At the present time the information on a neutron induced gamma ray spectrum is largely background noise, for the most part due to compton scattering. Spectral analysis is currently being used to provide ratios of the elements carbon and oxygen which are interpreted to indicate the presence of hydrocarbons or water. Due to the high background noise level in a neutron induced gamma ray spectrum, it has not previously been possible to determine specific amounts of individual elements from spectral interpretation.

When a high-energy neutron bombards a rock formation, the neutron can collide "inelastically" with an atomic nucleus and transfer energy to it. The nucleus assumes an excited state, decays and emits a quantum of gamma radiation which is recorded by the logging tool in an "inelastic" spectrum.

The neutron can interact further with the atoms in the formation by other mechanisms. The neutron can lose energy by random thermal scattering with various atoms (so-called compton scattering). Eventually most neutrons will be captured by formation nuclei, leaving each such nucleus in an excited state. The excited nucleus, in most cases, almost instantaneously decays and emits a quantum of "capture" gamma radiation at an energy which is characteristic for each type of nucleus. Such "capture" gamma radiation is recorded by the logging tool in a "capture" spectrum.

The signal on either a capture or inelastic spectrum records the magnitude of gamma radiation as a function of energy. Due to the quantum nature of matter, each element emits gamma radiation at characteristic energies. The energies involved in inelastic or capture interactions are sufficiently large relative to the neutron's initial energy that one gamma ray is emitted with each event.

There is a direct correspondence between the number of gamma rays emitted and the number of atoms interacting with the neutrons in capture or inelastic scatter events. If the number of counts of gamma rays at particular energies could be ascertained, it would be possible to quantitatively determine the amount of each element present in the formation.

However, at the present time it has not been possible to determine count numbers from neutron logging data because compton scattering dominates the entire ranges of both the capture and the inelastic spectra and can exceed 90% of the recorded information.

When compton scattering occurs, the neutron dislodges an electron from the interacting atom. The freed electron initiates a chain reaction and dislodges many other electrons in the process of reaching thermal equilibrium with the formation. The newly dislodged particles in turn dislodge other particles. These interactions produce a cascade of gamma rays which is detected by the logging tool.

The number of gamma ray counts attributable to compton scattering does not correspond to the number of atoms in the formation because of the cascading effect. Unfortunately, compton scatter permeates the entire spectrum recorded by the logging tool. This has previously made it impossible to correlate count numbers with the amount of any given element in the formation.

The compton effect varies from place to place over the spectrum, depending on the particulars of a large number of interactions, which are randomly produced. Compton scattering is also variable depending on borehole conditions, tool positioning and design, the presence of drilling muds, and other factors. Hence, one cannot merely measure relative peak heights from the spectrum to determine count numbers. It would be desirable to develop techniques for enhancing neutron logging data to reduce compton scattering noise.

The limited resolution of detectors in neutron logging devices has also contributed to the background noise problem. There are elements in the formation whose gamma rays of capture or inelastic scatter possess energies close to energies of gamma rays from elements of interest. These "spurious" gamma rays are sometimes counted by the detector at the energies of interest and contribute to broadening of the signal peaks. Conversely, a portion of the desired "count" is sometimes assigned an incorrect energy by the detector. It would be desirable to develop techniques for enhancing neutron logging data to minimize this problem.

The "Carbon/Oxygen" neutron logging tool was developed to determine whether hydrocarbons or water are present in a formation by ascertaining whether capture and inelastic spectra indicate the presence of carbon and oxygen. No attempt has previously been made to determine the percentage amounts of these elements due to the compton scattering noise problem. The Carbon/Oxygen spectra have been previously used to supply a crude ratio of carbon peak to oxygen peak to indicate the presence or absence of oilbearing zones (hydrocarbons). By taking a ratio of peaks, the compton scatter is proportionately reduced. However, the usable information is in the form of a ratio of peak height of one element to peak height of a different element. Such ratios alone cannot determine the count numbers or percentage amounts of any elements independently of each other.

It would be desirable to develop a technique of in situ measurement of rock formations which indicates the correct amounts of certain elements in the rock formation so that an accurate lithology can be determined. It would also be desirable if such a technique were applicable to complex reservoirs where lithology is a function of many variables.

SUMMARY OF THE INVENTION

To satisfy the above needs, this invention provides a method for enhancing spectral data in a neutron induced gamma ray logging record, and a method for obtaining a quantitative lithology from in situ measurement of subterranean rock formations.

The raw spectral data in such a neutron induced gamma ray logging record is produced by bombarding a subterranean rock formation in situ by high energy neutrons from a source in a logging tool, detecting at various intervals along the rock formation gamma radiation through a range of energies, such gamma radiation being induced by the bombardment, and recording on a record medium the detected radiation. The raw spectral data includes for each depth interval recorded a signal component superimposed on a noise component. The signal component is attributable to gamma radiation by elements of interest, while the noise component includes a portion attributable to compton scattering in the formation.

The method for enhancing spectral data comprises, for each depth interval recorded, generating a baseline signal representing the portion of the noise component attributable to compton scattering; subtracting the baseline signal from the spectral data to generate a noise-reduced difference signal; and assembling the noise-reduced difference signals for the intervals to provide an enhanced spectral logging record.

The enhanced spectral logging record is preferably calibrated by comparing it to a second such noise-reduced enhanced spectral logging record taken of a rock formation of known composition to determine the abundances of the selected elements present at the recorded intervals.

The method for enhancing spectral logging records finds particular application in a method for determining the lithology of a rock formation by in situ measurement according to this invention.

The method for lithology determination includes the steps of generating such a calibrated enhanced logging record from in situ measurement and comprises the further steps of assigning an initial value of water saturation and of porosity to the formation at each interval; using the measured amounts of the selected elements from the enhanced logging record, and the values of water saturation and of porosity, to derive amounts of selected minerals comprising mixtures of the particular elements present at the measured intervals; using the derived values of the selected minerals to correct the values of water saturation and of porosity; repeating the last two steps using the latest corrected values of water saturation and porosity until such values converge within a selected limit, to determine, for the measured intervals, the composition of the rock formation including the abundances of the selected minerals; and assembling the intervals to produce a lithoogic log of the subterranean rock formation.

DESCRIPTION OF THE DRAWINGS

These and other features and advantages of the invention will be more readily understood by reason of the following detailed description when considered in conjunction with the following drawings, wherein:

FIGS. 4-6 depict steps in the generation of a baseline signal for a logging record of the type shown in FIG. 2, wherein:

FIG. 4 depicts a cleaved data signal generated from a smoothed data signal;

FIG. 5 depicts a splined data signal generated from the cleaved data signal;

FIG. 6 depicts a completed baseline and a noise reduced difference signal corresponding to the smoothed data signal of FIGS. 4 and 5.

DETAILED DESCRIPTION

Figure 1:
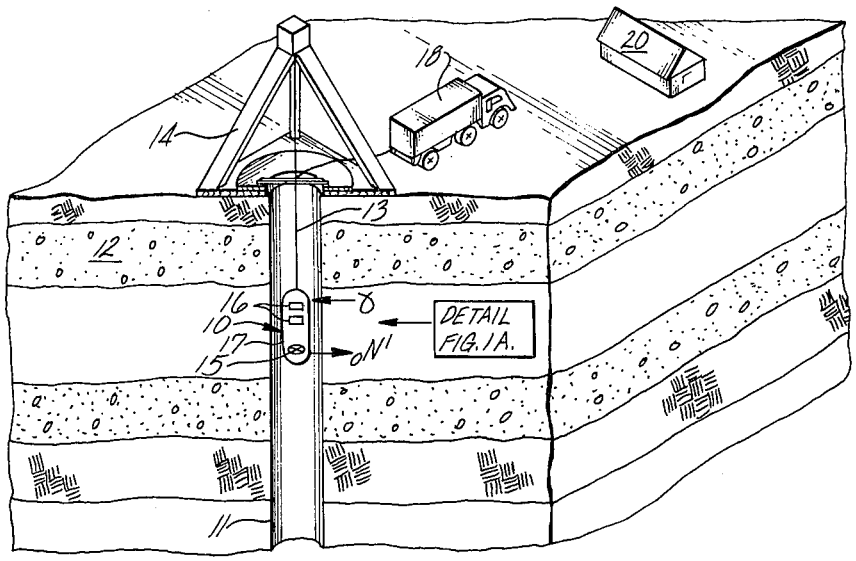
FIG. 1 is a schematic representation in elevation of a neutron logging tool in a subterranean borehole taking in situ measurement of a rock formation to produce a neutron logging record for enhancement according to this invention.

A neutron logging tool 10 is placed in a subterranean borehole 11 alongside a rock formation 12. The logging tool is a conventional neutron induced gamma ray logging tool and is lowered into the borehole by conventional methods, such as by lowering it on a wireline 13 from a derrick 14 on the surface. The logging tool, wireline and derrick all contain the necessary connections to enable telemetry of data detected by the logging tool into a record, typically a spectral graph in digital form, at a surface station 18, shown in a truck in FIG. 1.

The neutron logging tool includes a neutron source 15 and one or more detectors 16 which are contained in a housing 17. In operation, the source periodically emits bursts of high energy monoenergetic neutrons. By the term "high" energy is meant an energy level of the neutron which is sufficient to induce inelastic interactions with formation nuclei, in particular the elements carbon and silicon. The presently preferred tool employs a deuterium/tritium pulsed neutron source periodically emitting monoenergetic neutrons every one thousand microseconds at an energy of 14.02 MeV. A Van der Graaf generator can also serve as the neutron source.

The detector can be a conventional crystal scintillation detector which activates an array of photomultiplier tubes, or the detector may comprise a solid state detector. An exemplary neutron induced gamma ray logging tool is known to the oil exploration industry as a "Carbon/Oxygen" neutron logging tool and is currently manufactured and operated by Dresser/Atlas Industries, Inc. of Texas.

Figure 1A:
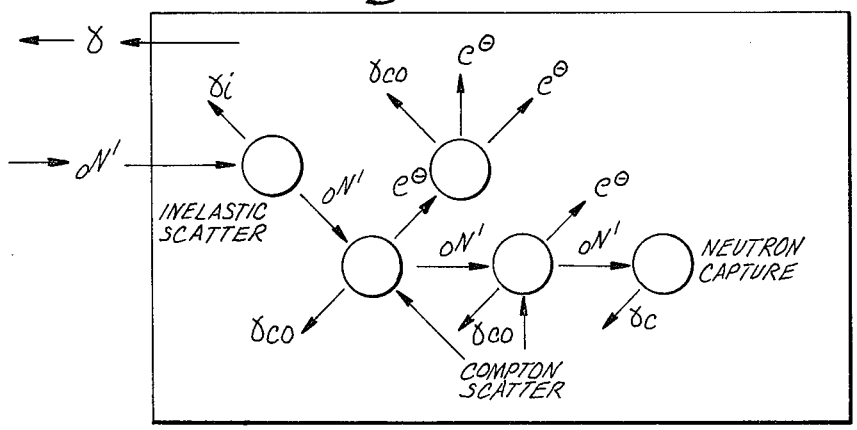
FIG. 1A is a schematic representation of events occurring in the formation of FIG. 1 during a typical neutron lifetime.

The neutrons emitted by the logging tool enter the formation and undergo various interactions with atoms in the formation. The important interactions involve the emission of gamma radiation which is detected by the detectors in the logging tool. There are three interactions of interest, which are depicted in FIG. 1A: inelastic scatter, compton scatter, and capture.

Inelastic scatter can only take place while the neutron is highly energetic, typically during the first fifty microseconds of neutron lifetime. In an inelastic interaction, the neutron scatters from a formation nucleus leaving the nucleus in an excited state, which then decays with the emission of gamma radiation, depicted by the symbol $\gamma i$. The probability of inelastic scatter, called the inelastic scatter cross section, differs for each element. "Inelastic" gamma rays scatter in random directions and some of them are eventually detected by the detectors in the logging tool.

The lowest excited states for most nuclei found in the borehole environment are in the range 1-7 MeV. Applying conservation of energy, it can be seen that the neutron must loose considerable energy in any inelastic collision, which energy is transferred to the nucleus. Once the neutron is reduced in energy below the level required to excite an atomic nucleus, further inelastic scatter will not occur.

The neutron, having lost energy, can compton scatter with a formation atom by transferring energy to one of its electrons. The excited electron emits a gamma ray, designated by the symbol $\gamma co$, and scatters into the formation. The freed electron typically reacts with other electrons which, in turn, are likely to interact with other particles, generating many new gamma rays. Compton scattering creates a cascade of gamma rays which is also sensed by the detector.

The neutron may compton scatter many times with various atoms before reaching thermal equilibrium. Thus, although only two compton interactions are depicted in FIG. 1A, it will be appreciated that many such interactions may occur during a typical neutron lifetime.

Eventually the neutron is captured by a formation nucleus which emits a gamma ray of capture, designated as $\gamma c$. A portion of the "capture" gamma rays are also detected by the detector.

The motion of the gamma rays induced from neutron bombardment is random. However, since the neutron logging tool periodically emits a large number of monoenergetic neutrons, the detector will pick up a statistically significant number of returning gamma rays. Thus, the signal recorded by the logging tool can indicate the abundance of certain elements in the formation.

It is presently preferred to measure the presence of four elements in particular: carbon, silicon, calcium and sodium. These four elements are useful for determining a quantitative lithology of a granite wash formation from in situ measurement. However, the method of enhancement of neutron induced gamma ray spectral logging records extends beyond these four elements and can be expanded, if desired, to include measurement of other elements, such as, for example, hydrogen, oxygen, magnesium, aluminum, chlorine, potassium, iron, thorium and uranium.

Each inelastic scatter or capture event produces one gamma ray $\gamma i$ or $\gamma c$. However, due to the nature of compton scattering, there is a large number of gamma rays produced for each compton interaction of a neutron with an atom in the formation. Hence the magnitude of compton scattering detected by the logging tool is many times larger than the magnitude of either inelastic scatter or capture events.

An exemplary conventional detector in the logging tool employs a scintillation crystal which operates by sensing the incidence of gamma rays through a range of energies. When a gamma ray impinges on such a detector, the scintillation crystal emits photons, the brightness of which are proportional to the energy of the incoming gamma ray. The scintillations are sensed by an array of photomultiplier tubes, amplified and converted into an analog electrical signal. The amplitude of the signal indicates the incidence of the gamma ray and its energy. The signal is conventionally telemetered to the surface station 18 were it is ultimately transformed by a conventional multichannel analyzer into digital form on a tape which can be printed out on a graph as an inelastic spectrum or a capture spectrum. Each spectrum records the magnitude of gamma radiation as a function of energy.

It will be appreciated that other detectors which record retuning gamma rays may be used in the logging tool. The design of the detector does not form a part of this invention and such detector may operate in either a digital or analog mode.

The presently preferred neutron source periodically emits a burst of monoenergetic high-energy neutrons every one thousand microseconds. It will be understood, however, that the period selected may vary depending on the source generating the neutrons, and on the sophistication of the medium chosen for recording the inelastic and the capture spectrums. In the presently preferred best mode, the detector operates continuously and the surface station is arranged to record a pair of signals. The first signal records the detector output for the entire cycle from zero to one thousand microseconds, while the second signal records the detector output from a time frame starting with fifty microseconds after each neutron burst to the end of the cycle at one thousand microseconds.

The inelastic scatter events require a relatively high energy and occur for practical purposes during the firsft fifty or so microseconds after the neutron pulse or burst. The capture events, on the other hand, do not occur significantly during the first fifty-microsecond time period. Accordingly, by subtracting the second signal from the first signal, the time interval from zero to fifty microseconds is isolated and becomes the record for the inelastic scatter spectrum, while the second signal is used to generate the capture spectrum.

It will be appreciated that other arrangements and timings for detecting an inelastic scatter spectrum separately from a capture spectrum can be utilized if desired. The periodic pulsing of monoenergetic neutrons from the logging tool provides a convenient method for separating an inelastic spectrum from a capture spectrum using a continuously operating detector or array of detectors.

The data recorded at the surface station 18 by the multichannel analyzer is transferred to a data enhancement station 20. At this point, the data if printed out would comprise a raw inelastic spectrum and a raw capture spectrum.

Figure 2:
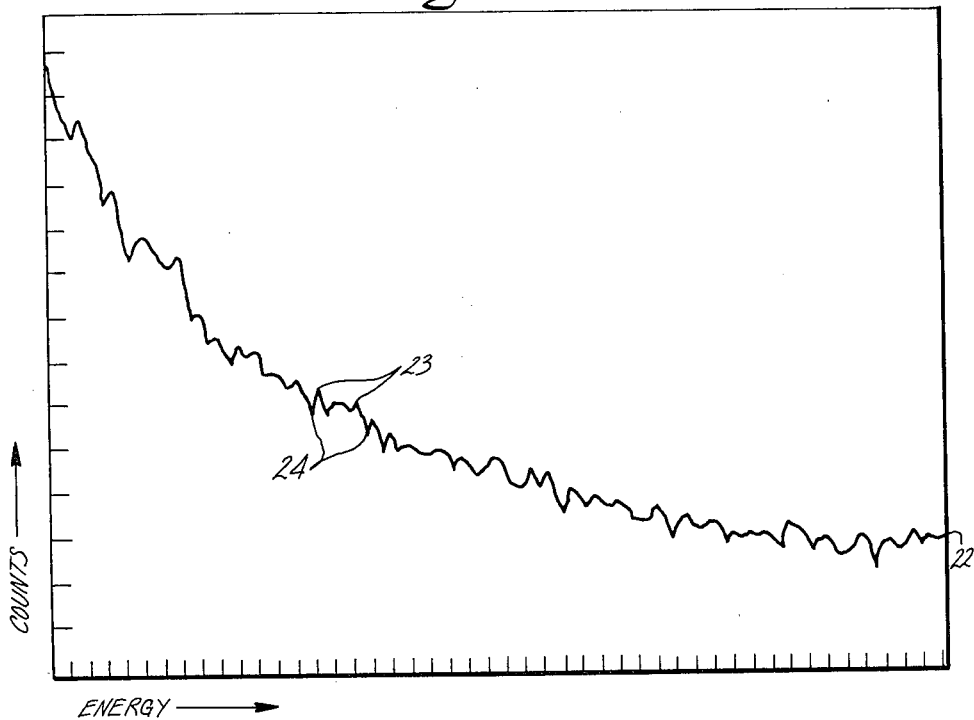
FIG. 2 is a graphical depiction of a raw neutron induced gamma ray logging record.

FIG. 2 depicts a typical inelastic or capture raw spectrum. The counts, or magnitude of gamma radiation, is plotted on the ordinate against energy channels plotted on the abscissa. There is one data point per channel. Each energy channel is a convention of measurement for the abscissa used by a conventional 256-channel multichannel analyzer. To obtain the energy of a typical gamma ray found in a particular channel, the channel number is multiplied by the coefficient 0.03473, the product equalling the energy of the gamma ray in MeV. Hence, each channel sums the gamma rays which have energies within a common range which is 0.03473 MeV wide.

Both the inelastic spectrum and the capture spectrum exhibit common features which are illustrated in FIG. 2. A data signal 22 exhibits a number of peaks 23 and troughs 24 and in general decays with increasing energy from left to right across the spectrum. The data signal is most readily visualized by connecting the data points in the channels by a pencil line or the like to generate a data "curve" which is the manner of representation of the signal in the accompanying drawings in this document. The data signal includes a signal component superimposed on a noise component. The noise component accounts for upwards of 90% of the raw data signal. The signal component represents inelastic scatter or capture gamma radiation by various elements of interest in the formation, preferably silicon and carbon, or sodium and calcium. The noise component represents high-frequency noise, compton scattering, and background noise. The high-frequency noise is manifested as the roughness of the data curve. The background noise can be attributed to environmental factors in the borehole, such as the presence of drilling mud, the borehole casing, the distance between the detector and the formation, and other factors.

The major portion of the noise component, however, is attributable to compton scattering, which may exceed 95% of the noise component. Compton scattering varies from place to place over the spectrum so its effect is not a uniform function of energy.

This invention provides a method for eliminating compton scattering effects so that a true signal portion of the data curve can be ascertained and the amounts of particular elements in the formation determined. A flow chart for such a method is presented in FIG. 7.

To enhance the data in the inelastic spectrum and the capture spectrum, the recorded information 50 is subjected to computer processing which filters (55) high-frequency noise, generates a baseline signal (60-64) which represents the noise attributable to compton scattering, and subtracts (65) the baseline from the data to generate a difference signal which can be used to determine the abundances of elements present in the formation.

An exemplary computer used to implement the method of data enhancement is a model 8520 computer manufactured by TRW-FUJITSU Company of Los Angeles, California. This machine has a ¾ megabyte core with a 50 megabyte fixed disc capability.

The first step of the process of data enhancement preferably involves filtering high-frequency noise from the raw spectral data to obtain a "smooth data curve". The presently preferred filtering technique involves a three-step procedure. First, the data is transformed by fourier analysis (56) into a sinusoidal representation. This is preferably implemented onto a computer using a fast fourier transform subroutine. An exemplary fast fourier transform subroutine which is commercially available and suitable for practice of this invention is available from TRW-FUJITSU under the program name RFT. The fast fourier transform subroutine expresses the raw data in terms of a series of coefficients and sine waves.

The second step of the filtering procedure is the application of a damping factor (57) to the transformed data. The damping factor is an exponentially decaying operator of the form $e^{-(DF)i}$, where DF is a damping coefficient and i is the variable. The damping coefficient can be selected as a percentage ranging from zero to unity. It is presently preferred that the coefficient be selected in the range from about 0.10% to about 0.25. Such an exponential damping instruction may be readily implemented in source code on the TRW-FUJITSU model 8520 computer using very ordinary skill.

The selection of the particular damping coefficient depends on the quality of the data received. A value for the damping coefficient of about 0.25 is preferred for "long" interval readings which are taken for at least 300 seconds and for stationary readings. For such readings, the logging tool is moving slowly or not at all through the borehole and the detector has a sufficient time to accumulate a statistically large number of counts so that resolution is high and high-frequency noise not so apparent.

On the other hand, for readings as short as about twenty seconds, a damping coefficient of about 0.10 is preferred as a greater degree of damping is needed than with much longer readings. Thus, the speed of traverse of the detector through the borehole reflects on the quality of data received and the corresponding need for damping of high-frequency noise.

The third step of the filtering procedure involves transforming the damped data back into numerical form by inverse fourier analysis (58). This procedure is preferably implemented by an inverse fast fourier transform computer subroutine. An exemplary inverse fast fourier subroutine may be implemented on the TRW-FUJITSU model 8520 computer by using the fast fourier subroutine RFT with an instruction to change variables.

Fourier analysis of the raw data has the effect of isolating the high-frequency noise relative to the data signal. By damping the transformed data and inversely transforming it back into a numerical representation, the high-frequency noise is eliminated without substantially affecting the data signal.

Figure 3:
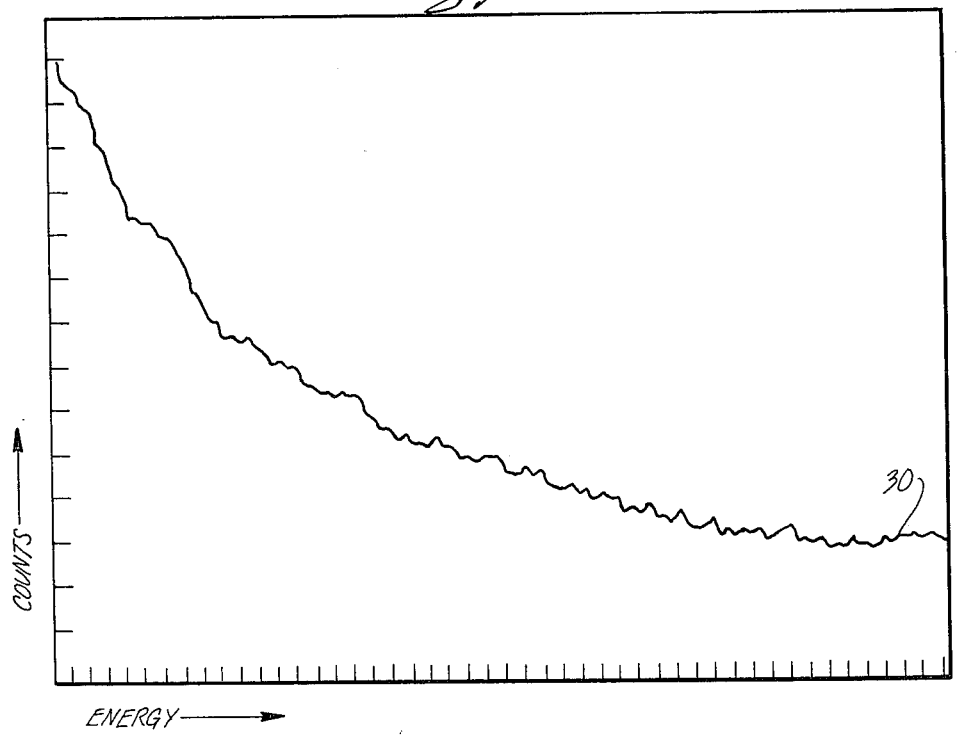
FIG. 3 is a graphical representation of a smoothed data signal obtained by filtering the logging record of FIG. 2.

At the end of the filtering process, the high-frequency noise present in the raw spectral data has been substantially eliminated, and the data is in the form of a smooth data signal or curve 30, shown in FIG. 3. The smooth data curve still contains the compton scatter noise superimposed on the capture or inelastic signal, and exhibits the major decay characteristics present in the raw data curve.

The smooth data signal contains one data point per channel. A curve drawn by pencil between the points is "smooth" in that it does not exhibit high-frequency noise effects. Although methods other than the presently preferred one described above may be used for eliminating high-frequency noise, the described method is particularly preferred because of the availability of the fast fourier and inverse fast fourier computer subroutines at low cost and high speed.

The next step in data enhancement is the generation of a "baseline" signal which corresponds to the compton scattering effects. This process is depicted in stages in FIGS. 4-6, where a baseline signal 35, 38 and 40 is generated for a smooth data signal 30. The baseline generation technique approximates a reference line for the smooth data signal 30 which can be used to determine peak heights.

Figure 4:
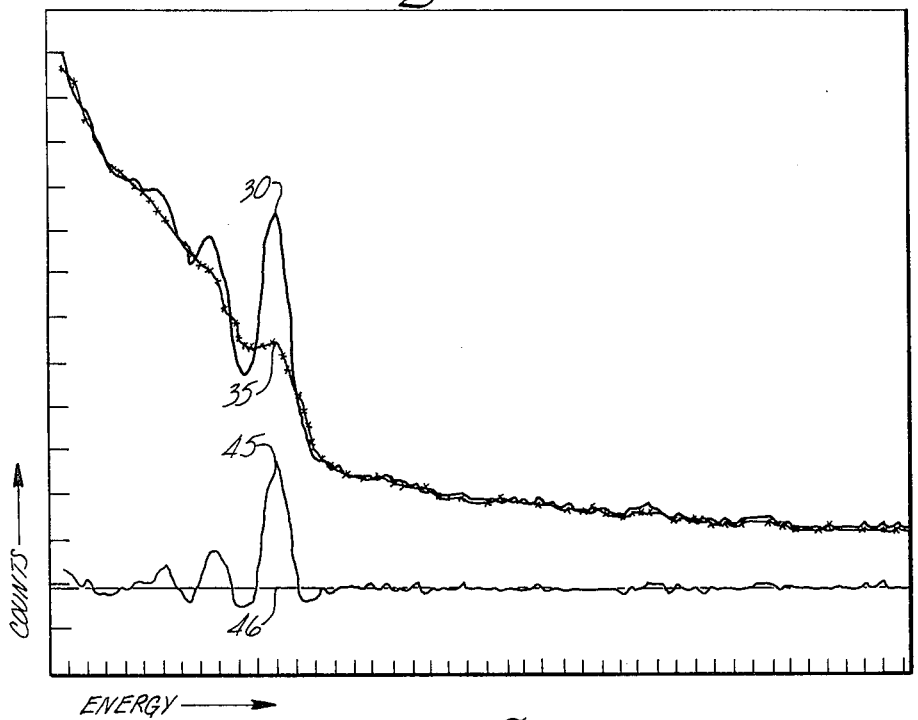
Figure 7:
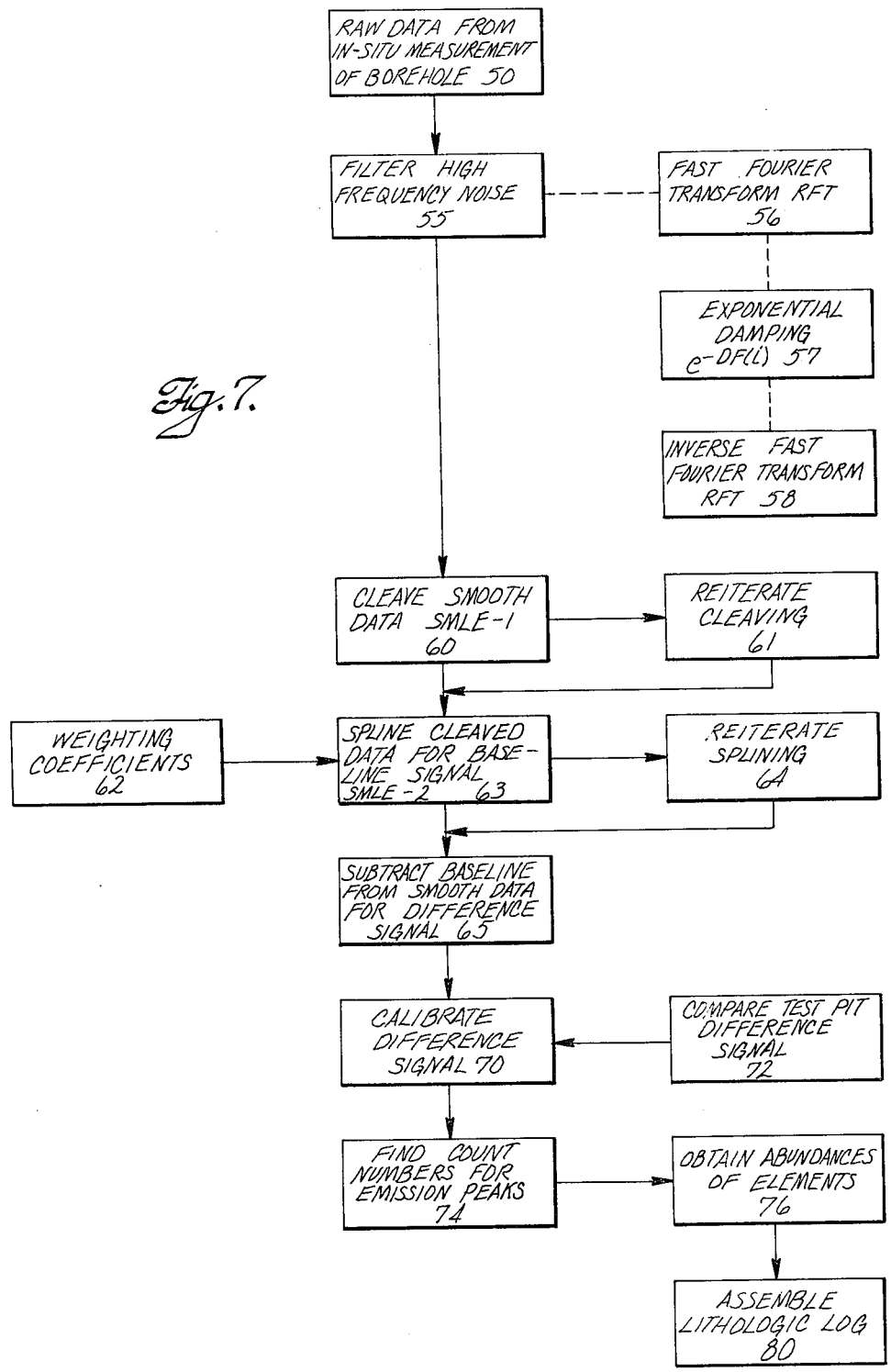
FIG. 7 is a flow diagram for a method for enhancing neutron induced gamma ray logging records according to this invention.

The process of baseline generation begins with "cleaving" the smooth data curve depicted in FIG. 4, and by box 60 in FIG. 7. Cleaving is a recursive procedure of finding at least squares polynomial fit for localized segments of the smooth data signal. In the presently preferred method of this invention, the smooth data signal 30 is subdivided into a series of equally-spaced small intervals, each about five or seven channels wide. The "best" least squares approximation polynomial is found for each localized segment containing five or seven data points.

It is preferred to implement cleaving on a digital computer. An exemplary cleaving subroutine which is suitable for practice of this invention is commercially available from the TRW-FUJITSU Company of Los Angeles, Calif., under the subroutine name SMLE-1.

The technique of data cleaving considers successive localized segments of the smooth data signal. A least squares approximation is made for the central point of a local segment, and a new segment is then considered.

As an example, assume an approximation is being made for an arbitrary point on the smooth data signal. The point is considered along with an equal number of neighboring points in channels on either side of the (central) point. In the presently preferred best mode, the segment is taken to be five consecutive channels wide so that two points are considered on either side of the central point. A least squares approximation evaluation is performed on the five data points so that the best fit is found for a polynomial of order one or three. In the subroutine SMLE-1, the order of the polynomial may be programmed into the computer. Presently it is preferred that the order of the least squares approximation polynomial be limited to one as it is desired to obtain a cleaved data signal 35 in FIG. 4 which minimizes bumps. Thus, a curve connecting the points in the cleaved data signal does not respond quickly to sudden changes in the signal portion of the data but is more greatly influenced by the character of the compton scattering noise portion.

Once the least squares approximation has been found for a local segment, the value of the approximation at the central point is substituted for the central point. The data cleaving procedure then considers a new set of five data points which are shifted successively by one channel from the first set. For example, if the first set of points is located in channels 1, 2, 3, 4 and 5, then the second set of points considered would be located in channels 2, 3, 4, 5, and 6. A new least squares approximation polynomial is found for the second set of points, and its value is substituted for the new central point, in this case, for channel 4. This process of least square approximation is repeated until the ordinates or values of all points on the smooth data curve have been substituted to generate a cleaved data signal 35.

During data cleaving, the value of a data point from the previous iteration is always used when considering a new localized segment of data points. For example, when a first segment consisting of channels 1 through 5 has been processed so that the value at channel 3 has been corrected, the previous value in channel 3 is used for computing an approximation for channel 4 in the next segment containing channels 2 through 6.

The process of data cleaving is reiterated (61) over the entire data signal a predetermined number of times to generate a cleaved data signal 35. In FIG. 4, a cleaved signal 35 was generated from a smooth data signal 30 by recursing the SMLE-1 routine ten times. It is apparent from inspection of the curves connecting the points of the data signal or the cleaved data signal that the cleaved data signal 35 is partly above and partly below the smooth data signal 30; hence, its description as a "cleaved" data signal. Each time the data cleaving procedure is recursed, the substituted values from the last previous iteration serve as a new base of data points for the next iteration. This new series of points is used for computing the new least squares approximations.

It is presently preferred that data cleaving by recursively finding localized least squares approximation fits be repeated from about five to about twenty times to generate the cleaved data signal. In an exemplary practice of the invention, the cleaved data signal is generated after ten iterations of the least squares approximation subroutine SMLE-1, as per FIG. 4.

The ultimate object in generating the baseline signal is to produce a signal which is nowhere above the smoothed data signal. It will be noticed that the cleaved data signal 35 in FIG. 4 is partly above and partly below the smoothed data signal 30.

Figure 5:
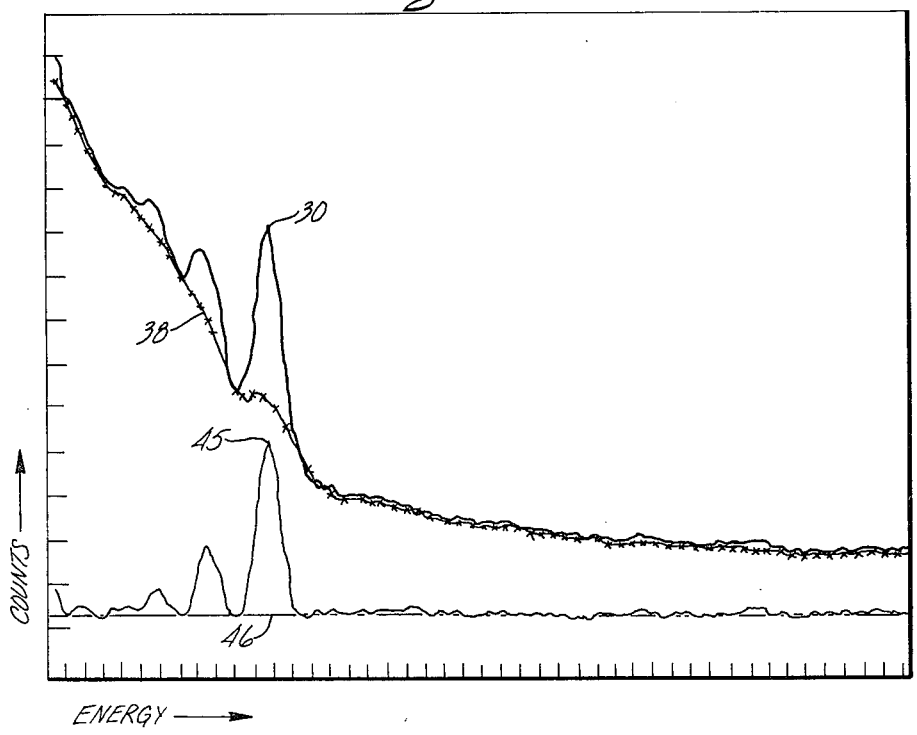
Figure 6:
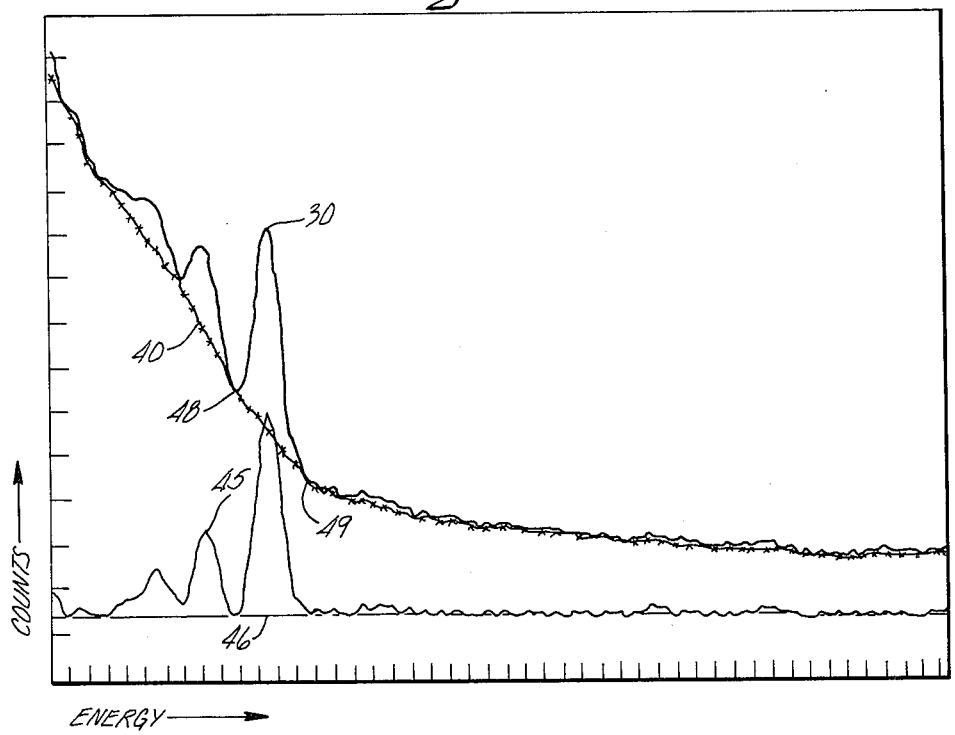

The next step of baseline generation is a "splining" step (63) which involves recursively finding a best least squares polynomial approximation fit to localized segments of the cleaved data curve using a weighting function. This procedure is depicted in FIGS. 5 and 6. The splining step differs from the cleaving step in that a weighting factor (62) is assigned each of the data points before a least squares approximation polynomial is fitted to the localized segments of the data signal. Approximations are then made to the cleaved data signal 35 to generate a splined signal 38. During the splining procedure, any previously corrected data point which lies above the smoothed data signal 30 is assigned a weighting coefficient near zero, while every previously corrected data point which is at or below the smoothed data signal is assigned a larger weighting coefficient which is near unity. In a presently preferred practice of this invention, the coefficients for the points above the smoothed data curve is selected at about 0 to about $\frac{1}{2}$, while the coefficient for the points below the smoothed data curve is selected at about 1 to about $1\frac{1}{4}$. In a particularly preferred practice, the coefficients are, respectively, 0.10 and 1.20. The localized segment interval chosen for the splining fit is presently preferred at seven channels wide, although intervals of about five to about nine points could be used if desired.

Splining is accomplished by fitting a new series of least squares approximations to localized segments of the cleaved data curve using the weighting factors. An exemplary computer subroutine which is presently preferred for implementing this task is commercially available from TRW-FUJITSU under the program name SMLE-2. Splining by this subroutine is performed by using the local least squares approximating polynomial of first order specified in connection with successive sets of seven neighboring observed data values.

The polynomial splining technique is recursed (64) a sufficient number of times to generate the baseline signal 40 which is nowhere above the smooth data signal 30. Each time that splining is recursed, the coefficient weighting each data point is selected depending on whether the point is above or below the smooth data signal. This process is depicted stepwise in FIGS. 5 and 6. In FIG. 5 a splining signal 38 was obtained by applying the least squares approximation procedure with weighting coefficients 5 times, while in FIG. 6, the splining signal 39 was obtained by applying the weighted least squares approximation procedure 20 times. By comparing FIG. 5 with FIG. 6, it is apparent that the splining procedure shifts the baseline signal to lie below the smooth data signal 30. By assigning a larger weighting coefficient to points which lie below the data signal than to points above the signal, the baseline signal becomes a reference for the smooth data signal.

The number of iterations with polynomial splining is preferred at about five to about thirty. The presently preferred method uses polynomial splining recursed from about ten to about twenty times.

It is possible to perform the entire baseline generation technique using only the least squares approximation procedure with weighting coefficients (polynomial splining), and omit data cleaving, but such a methodology would involve a greater amount of computer time and cost. It is presently preferred to initially cleave the data without weighting coefficients before applying the polynomial splining technique to maximize use of computer time. The cleaving technique repeated from about ten to about seventy-five times over the entire data signal takes about 25 seconds of computer time, while the weighted splining technique repeated from about ten to about twenty times taken about 75 seconds to perform.

The baseline signal 40 is everywhere at or below the smooth data signal 30. The baseline signal 40 represents the portion of the noise component which is attributable to compton scattering effects.

There are advantages to generating a baseline signal by cleaving and splining procedures which operate on localized segments of the data signal instead of considering the entire data curve at once. First, by subdividing the data signal, each segment influences only a local area of the baseline. For example, the baseline generated at the high energy end of the curve is not influenced by phenomena occurring at the low energy side. The general slope of the data curve at the high energy side is much steeper than at the low energy end. By subdividing the curve into small local segments for cleaving or splining, preferably about 5 to about 9 channels wide, the procedure is sufficiently versatile to approximate or fit the data signal both at places where the values change or fluctuate rapidly as well as relatively flat areas.

In the next step of the data enhancement process, the baseline signal is subtracted (65) from the smooth data signal to obtain a difference signal 45, which represents a true signal component for the inelastic or capture spectrum. The difference signal physically represents substantially the number of counts of gamma radiation which is attributable to either inelastic scattering or capture events.

The difference signal is an enhanced spectral logging record which is substantially free of high-frequency noise and compton scattering effects. In FIGS. 4–6, a difference signal 45 is depicted along with an origin or zero value line 46 to illustrate the eventual generation of a true baseline signal 40. It is observed that the difference signal obtained from a preliminary baseline 35 or 38 in FIGS. 4 and 5 falls below the origin line at a number of locations. This indicates that the baseline lies above the smooth data signal at spots so that the preliminary baseline has not quite isolated the compton scattering noise portion of the spectrum from the signal.

There is a degree of operator judgment involved in selecting the particular damping coefficients for high frequency noise reduction, the segment width and the number of recursions for data cleaving and splining, and the weighting coefficients for splining, to optimize the baseline generated in order to minimize noise effects in the difference signal. This is because the character of the difference signal is, to some extent, influenced by environmental conditions in the borehole. For example, a difference signal taken of a formation which includes one-inch metal casing will yield a spectrum which is attenuated relative to a difference signal taken from the same formation but lacking the casing. However, the selection of the various factors can be readily exercised by those having ordinary skill in the art to which this invention pertains.

The difference signal requires calibration (70) to obtain the abundances of elements present in the formation. The difference signal is calibrated by comparing (72) it to a test-pit difference signal taken from a rock formation of known composition. The latter difference signal is generated according to the data enhancement method of this invention from measurements taken in a test pit or laboratory, rather than from a subterranean borehole. The test pit data base can also originate from wells which have had cores or samples analyzed in labs.

The test-pit conditions are chosen to duplicate as much as is practicable the actual borehole environmental conditions, such as the presence, thickness and type of casing, the tool-formation distance, and the composition of any drilling muds that may be present in the borehole. It is preferred that a reference library of test-pit data be available so that calibration of a difference curve may be performed using environmental conditions which duplicate the actual conditions in the borehole as closely as possible. However, crude calibration will suffice for practice of this invention.

One advantage to this invention resides in generating a difference signal (65) before calibrating (70) the data. This makes the method of data enhancement insensitive to errors in logging tool calibration which increases the utility of the invention.

The test-pit data used for calibrating the difference signal has been normalized so that it serves as a standard of measurement against which the count numbers and percentage elements in the difference curve can be determined. By comparing the difference signal to test-pit data which closely approximates the conditions in the borehole, environmental effects on the detector are substantially eliminated and the resolution of the process improved.

There are two presently preferred steps for calibrating the difference signal. The first involves establishing individual windows which contain characteristic emission peaks and searching for the minimum on the leading or low energy side of the peak. It is preferred to search for at least one low energy peak and one high energy peak so that both ends of the spectrum are calibrated. At the present time, an $H_2$ emission at 2.2 MeV and an iron emission at 6.64 MeV are selected as the reference peaks. These peaks occur at isolated portions of the spectrum, where other peaks are not expected to occur, and involve emissions which are always recorded due to the presence of iron in the logging tool and hydrogen in the wellbore.

It is preferable to match up the leading edge or low energy side of the peaks in the difference curve and the test pit difference curve, rather than the high energy edge or the summit. This is because the slope of the data curve generally decreases as energy increases. Accordingly, the baseline signal intersects an extension of the low energy side of an emission peak at a higher angle than at the high energy side of the peak. This can be observed by inspecting the configuration of the baseline signal 40 and the smooth data signal 30 at points 48 and 49 in FIG. 6. At point 48 on the low energy side of an emission peak, the curves are nearly orthogonal, while at point 49 on the high energy side, the curves made a much smaller angle. Accordingly, at the low energy side of the peak, the difference signal can be nearly perpendicular to the origin line 46; while on the high energy side, the difference signal tends to make a smaller angle and tends to flatten out, as in FIG. 6. Thus, the point of intersection is more accurately determined on the low energy side of the emission peak and calibration is improved.

The second step for calibrating the difference signal involves interpolation. This is preferably combined with the first step so that once the locations of the $H_2$ and Fe peaks at, respectively, 2.2 MeV and 6.64 MeV have been corrected, the interior portion of the spectrums can be scaled by interpolation to fit these points.

Once the difference signal has been compared to the test-pit data, the signal is standardized, and the abundances of selected elements can be obtained (76) from the difference curve. To derive the abundances or percentage amounts of a particular element, the element's characteristic energies of inelastic scatter or capture, which are well known, are obtained by reference to a source on nuclear physics. The characteristic energies of inelastic scatter or capture are listed for the particular elements appearing in the spectrum, and the appropriate regions of the spectrum are consulted for the appearance or absence of the characteristic emission peaks.

The resolution of logging tools using presently-available conventional crystal scintillation detectors is such that the emission peaks of both capture and inelastic events will appear on the difference curve in broad "windows", which may be up to several channels wide. This phenomena reflects a statistical Gaussian-type distribution of emission energies produced by limitations in the resolving capabilities of the presently-available scintillation detectors. By considering a window or interval of appropriate width, the entire "area" under a Gaussian distribution will be considered so that substantially the entire count number attributable to a particular emission peak will be accounted for. It will be appreciated that with advanced detectors having a higher resolution than the presently available conventional detectors, such a window could be as narrow as one channel wide.

The areas under the appropriate windows are calculated and the count numbers determined (74) from the difference signal. The abundances of the elements in the formation are then determined (76) by correlating the count numbers with the calibration of the difference signal.

In a presently preferred practice of the invention, the abundances of the elements carbon and silicon are derived from the inelastic spectrum, while the amounts of calcium and sodium are derived from the capture spectrum at each depth interval measured by the detectors. By combining the calibrated difference curves for all intervals measured, a lithologic log is generated (80), which indicates the presence of these elements at various locations in the rock formation.

It will be appreciated by those having ordinary skill in the art that when the resolving capabilities of gamma ray detectors are improved, it will be possible to practice this invention and determine count numbers (74) and elemental abundances (76) from taking measurement of the heights of the emission peaks in the calibrated difference signal, rather than measuring the area under the difference curve inside appropriate energy windows. For example, when a germanium lithium (GeLi) detector is mated to a neutron logging tool, the resolution of the detector should be sufficiently high so that all windows indicating elemental emission of gamma rays should be sharply defined and occurring within one channel on the spectrum. It will then be possible to determine count numbers from simply deriving the height of the peak above the baseline signal, rather than the area under the difference curve, as is presently done due to the limited resolution of presently-available detectors. With such an advanced detector, the number of channels recorded will also increase from 256 to as many as 4096 or more.

The calibration of the difference signal with the test-pit data produces an important physical result. Due to the nature of the presently-available crystal scintillation detectors, a portion of the gamma ray count at any particular energy is assigned an incorrect energy and will appear shifted somewhat from its "true" position. Conversely, the count obtained at any given energy will include a portion attributable to spurious signals from neighboring energies which have been incorrectly identified by the detector at the given energy. The likelihood of such incorrect assignment of energies is a one-time statistical phenomena. By comparing the difference curve to the test-pit data, the effect of energy mislabeling is minimized, which corrects the count numbers. This improves the resolution of the process for determining the abundances of elements in a rock formation from in situ measurement.

By calibrating the difference curve, rather than the original data, the invention provides a method for enhancing neutron induced logging records which has wide utility. Practice of the method in accordance with these teachings can enhance spectra which have widely differing resolution, strong or attenuated signal strength, and quality.

The method for enhancing neutron induced gamma ray spectral data finds particular application in a procedure for determining a quantitative lithology of a rock formation from in situ measurement according to this invention.

The method of lithology determination is described in connection with a presently preferred application, a granite wash reservoir, which is a complex reservoir. It will be appreciated, however, that the methodology can be applied to other complex reservoirs as well.

There is a large variety of minerals present in a typical granite wash. However, these minerals can be classified into four key element groups classified by the presence of the key elements carbon, calcium, sodium and silicon. These four key elements occur in virtually all important mineral constituents of complex reservoirs. For other complex reservoirs, additional key elements may be included as needed to account for all major mineral occurrences; however this has not been found necessary for determining a quantitative lithology of granite wash by application of principles of this invention. The amounts of the key elements are determined by interpreting neutron activated gamma ray spectral logging records using the method of data enhancement described above.

There are seven major groups of minerals present in granite wash. These are feldspars, clays, micas, quartz, carbonates, glauconite and hydrocarbons. The feldspars include orthoclases containing potassium, albites containing sodium, and anorthites containing calcium.

The clays are subdivided into illites, chlorites, montmorillonites, and kaolinites. The micas are subdivided into biotites and muscovites. The carbonates are subdivided into calcites and dolomites.

The seven major mineral groups are subdivided into each of the four key elements by listing all possible minerals in which a particular key element can appear. Thus, any carbon present in the formation will appear either as a hydrocarbon or as a carbonate (either as calcite or dolomite), while calcium will only be present either in anorthite or in the carbonates. Sodium can be present only in albite or in saltwater, the latter being negligible and not considered. Silicon can occur in five mineral groups: the feldspars, the clays, the micas glauconite, and quartz.

Using a table of atomic weights, the total atomic weight of each mineral in a subgroup is listed and the percentage of the respective key element (carbon, calcium, sodium or silicon) is listed for each. The percentage of a key element represents the ratio of the atomic weight of atoms of the key element to the total atomic weight of the mineral.

For carbonates, clays and radioactive minerals, several minerals occur in a single mineral group for one key element. Accordingly, it is initially assumed that these minerals occur in equal proportions. For example, calcium can occur in a feldspar anorthite, $CaAl_2Si_2O_8$, or in the carbonates calcite ($CaCO_3$) and dolomite [$CaMg(Co_3)_2$]. The atomic weights of these three minerals are, respectively, 278.22, 100.09, and 296.84. The atomic weight of calcium is 40.08. Hence the percentage of the key element calcium in the feldspar subgroup (anorthite) is given by the ratio 40.08/278.22, or 0.144. The percentage of calcium in the carbonate subgroup calcite and dolomite is given by the ratio 2(40.08)/(100.09+296.84) or 80.16/396.93 or 0.09077. However, if the formation geology is known sufficiently so that the assumption of equal proportions is unreasonable, the listing of percentage of key elements can be modified to reflect local conditions.

Similarly, for hydrocarbons and clays, the atomic formulas or clay types can be varied to reflect expected local conditions.

It is preferred in the method of lithology determination that a suite of five conventional wireline logs be used. These are a neutron induced spectral gamma ray log, a compensated density log, a compensated neutron log, a passive spectral gamma ray detector log, and a resistivity log. The neutron induced gamma ray log is used to measure the abundances of the key elements, while the compensated density log is used to measure electron density in the formation. By correlating electron density with the atomic Z/A ratio by conventional techniques, the bulk density of the formation is determined. A conventional crossplot of the density log with the compensated neutron log indicates the porosity of the formation.

The passive gamma ray logging tool includes a detector which senses naturally occurring gamm radiation, principally from the elements uranium, potassium and thorium. An exemplary passive gamma ray detector is commercially available from Dresser/Atlas of Texas under the name Spectralog. The passive gamma ray log is interpreted by conventional methods known to the art to determine percentage amounts of the elements uranium, thorium and potassium.

The resistivity logs measure the electrical resistivity present in the formation and help determine the water saturation of a formation by conventional methods.

By interpreting the logging records from the density, compensated neutron, resistivity and passive gamma ray logging tools, apparent values for porosity and water saturation are generated by conventional methods. These values are not necessarily the true values of porosity and water saturation in the formation but are used as starting points for determining lithology. It is also possible to assume or estimate initial values, but deriving them from in situ measurement is preferred.

The amounts of the minerals present in the formation are determined by using the abundances of the key elements found from interpreting the data enhanced neutron induced gamma ray logs as described previously, along with the apparent values of water saturation and porosity.

For example, the key element carbon generally appears in a rock formation in two subgroups: hydrocarbons and carbonates. The value of hydrocarbon in the formation can be expressed in terms of porosity ($\phi$) and water saturation (Sw) by equation 1:

$$V_{HC} = \phi(1 - Sw) \quad (1)$$

Carbon ($C_{HC}$) associated with the hydrocarbon volume ($V_{HC}$) can be expressed by the equation:

$$C_{HC} = V_{HC} \frac{12.01}{12.01 + Y(1.01)} \quad (2)$$

where Y represents the number of hydrogen atoms in the hydrocarbon. It is assumed for this example that most of the hydrocarbon is present as CH, in which case Y is taken to be one. However, the formula can be varied to reflect local conditions.

The remaining carbon ($C_{carb}$), is associated solely with carbonates, as per equation 3. The total amount of carbon present ($C_{TOTAL}$) has been determined by in situ measurement and interpretation of the data enhanced neutron induced gamma ray inelastic spectrum. The remaining carbon is to be related to the percentage of carbonates in equation 4:

$$C_{carb} = C_{TOTAL} - C_{HC} \quad (3)$$

$$\% \text{ Carbonate} = \frac{C_{carb}}{(0.09077)} \times 100 \quad (4)$$

Calcium also occurs in only two mineral subgroups, carbonates and the feldspar anorthite. The percentage amount of carbonates has been determined in equation 4 with reference to the amount of carbon. The amount of calcium contributed to carbonates, $Ca_{carb}$, is expressed in terms of the percentage of carbonate and the amount of calcium present in carbonate (0.2019), by equation 5:

$$Ca_{carb} = (\% \text{ Carbonate})(0.2019) \quad (5)$$

The only other mineral subgroup containing calcium is the feldspar anorthite. The percentage of anorthite in the formation is expressed in terms of the amount of calcium determined from the neutron induced gamma ray capture spectrum ($Ca_{TOTAL}$), and the amount of calcium in carbonates ($Ca_{carb}$), by equation 6:

$$\% \text{ Anorthite} = \frac{(Ca_{TOTAL} - Ca_{carb})}{0.144} \times 100 \quad (6)$$

The key element sodium appears only in the feldspar albite. The atomic weight of albite is about 262.24 while the weight of sodium is about 22.99. Accordingly, the percentage of the key element sodium in the mineral albite is expressed by the ratio 22.99/262.24 and equals about 0.08767. Accordingly, the percentage presence of albite in the formation can be expressed in terms of the sodium content from the neutron induced gamma ray capture spectrum, and the presence of sodium in the mineral albite, by equation 7:

$$\% \text{ Albite} = \frac{Na_{TOTAL}}{(0.088)} \times 100 \quad (7)$$

Clay content and radioactive minerals, including orthoclase, are defined by combining conventional log analysis techniques, with a procedure described in a paper by Schenewerk, Sethi, Fertl and Lochman, 1980, "Natural Gamma Ray Spectral Logging Aids Granite Wash Reservoir Evaluation", SPWLA Symposium Transactions, June 1980, which is hereby incorporated by reference.

The plagioclase group contains albites and anorthites. By summing the figures determined previously for these minerals, % Albite and % Anorthite, the total plagioclase content is determined.

The quartz content is expressed in terms of the amount of the key element silicon determined from the carbon/oxygen inelastic spectrum, $Si_{TOTAL}$, and the percentage amounts of clays, plagioclases, and radioactive minerals, by equation 8:

$$\% \text{ Quartz} = Si_{TOTAL} - \frac{\% \text{ Clay}}{(0.271)} - \frac{\% \text{ Plagioclase}}{(0.260)} - \frac{\% \text{ Radioactive Minerals}}{(0.245)} \quad (8)$$

The divisors 0.271, 0.260, and 0.245, representing the percentages of silicon in the expected atomic formulas of the minerals, can be varied according to local conditions.

At this point, a lithology has been determined which lists the percentage amounts of various minerals in the formation starting with the determination of the four key elements carbon, calcium, sodium and silicon, based entirely on in situ measurement of the rock formation. This lithology is then used to correct the assumed values of porosity and water saturation. At this point, in situ measurement and interpretation of logging records have produced a quantitative lithology including percent minerals, porosity, and water saturation.

The procedure of determining lithology is then repeated using the abundances of the four key elements determined by enhancing the neutron induced gamma ray spectral logs, and the newly corrected values of porosity and water saturation. By reiterating the lithology determination, a corrected lithology is determined, and the values of water saturation and porosity are once again corrected. The lithology determination is reiterated sufficiently until the values of lithology, water saturation and porosity converge within selected limits.

In the presently preferred practice of this invention, the values of the minerals, water saturation and porosity have been found to sufficiently converge with an accuracy of about plus or minus about 5 percent after about two reiterations of lithology determination. The resolution is limited mostly by the capabilities of presently available conventional gamma ray detectors in the neutron induced gamma ray logging tool. The limitations in resolving powers of presently available gamma ray detectors places a limit on the accuracy of the abundances of the key elements determined from enhancing the neutron induced gamma ray capture and inelastic spectra. It is presently preferred that the lithology determination be reiterated until the value of water saturation converges within a value of plus or minus 5%, or porosity converges within a value of plus or minus 2%, or the percent minerals converge within values of plus or minus 5%.

Although the invention has been described and illustrated in the context of enhancing neutron induced gamma ray logs for determining a quantitative lithology from in-situ measurement of granite wash formations, many modifications and variations will be apparent to one skilled in the art. For example, the method of lithology determination from in situ measurement may be taken from rock formations other than granite wash. Granite wash was chosen as an example because it is presently preferred and has a complicated lithology. Certainly this invention can be applied to less complex reservoirs, or to more complex lithologies if the abundances of additional key elements are determined from in situ measurement. Moreover, this invention may be practiced with neutron induced gamma ray logging devices other than a carbon/oxygen log. It is therefore to be understood that within the scope of the appended claims, the invention may be practiced otherwise than is specifically described.

What is claimed is:

1. A method for enhancing raw spectral data in a neutron induced gamma ray spectral logging record, such data being produced by bombarding a subterranean rock formation in situ by high energy neutrons from a source and detecting at various intervals along the rock formation gamma radiation through a range of energies, such gamma radiation being induced by said bombardment, and recording on a recording medium such detected radiation to produce the raw spectral data which includes for each depth interval recording a signal component representing gamma radiation by elements of interest, and a noise component which includes a portion attributable to compton scattering phenomena, the method comprising:
   (1) for each depth interval recorded,
      (a) filtering the raw spectral data by reducing high-frequency noise present in such data to provide a smooth data signal;
      (b) generating a baseline signal from the smooth data signal, such baseline signal representing the portion of the noise component attributable to compton scattering;
      (c) subtracting the baseline signal from the smooth data signal to generate a noise-reduced difference signal; and
   (2) assembling the noise-reduced difference signals for the intervals to provide an enhanced spectral logging record.

2. A method according to claim 1 further comprising calibrating the enhanced spectral logging record by comparing it to a logging record of similar type taken of a rock formation of known composition.

3. A method according to claim 2 wherein the calibrated enhanced spectral logging record records the independent amounts of elements present, such elements being selected from the group consisting of carbon, silicon, sodium, calcium, oxygen, aluminu, magnesium, hydrogen, chlorine, iron, potassium, uranium, and thorium.

4. A method according to claim 1 wherein the signal component of the detected gamma radiation represents inelastic collision phenomena involving the elements of interest and the neutrons.

5. A method according to claim 1 wherein the signal component of the detected gamma radiation represents capture scattering phenomena involving the elements of interest and the neutrons.

6. A method according to claim 1 wherein the high energy neutrons are substantially monoenergetic when released from the source.

7. A method according to claim 1 wherein the high energy neutrons are produced by a deuterium/tritium source.

8. A method according to claim 1 wherein the step of smoothing the raw spectral data comprises:
   transforming the data by mathematical transforms;
   exponentially damping the transformed data by a selected damping factor; and
   retransforming the damped data by inverse mathematical transforms to obtain the smooth data signal.

9. A method according to claim 8 wherein the mathematical transforms comprise fourier transform.

10. A method according to claim 8 wherein the damping factor is an exponent in a decaying exponential function in the range of about 0.10 to about 0.25.

11. A method according to claim 1 wherein the step of generating the baseline curve comprises:
   (a) generating a cleaved data signal by substituting for each point on the smooth data signal the value of a least squares polynomial approximation fitted to a localized segment of the smooth data signal comprising a selected number of neighboring data points including the point being substituted;
   (b) repeating step (a) a selected number of times, each time substituting for each point of the cleaved data signal from the previous step;
   (c) comparing each point on the cleaved data signal from the previous repetition to the smooth data signal and assigning a weighting coefficient to each such point, the weighting coefficient being larger for points below the smooth data signal than for points above the smooth data signal;
   (d) generating a splined data signal by substituting for each point of the cleaved data signal from the previous repetition the value of at least squares polynomial approximation fitted to a localized segment of such cleaved data signal, each such localized segment comprising a selected number of weighted consecutive points of such cleaved data signal including the point being substituted, the consecutive data points being weighted by the weighting coefficients;
   (e) repeating steps (c) and (d) for each point of the splined data signal from the previous repetition a sufficient number of times until all points on the splined data signal lie at or below the smooth data signal.

12. A method according to claim 11 wherein the weighting coefficient for points below the smooth data signal is near unity, and the weighting coefficient for points above the smooth data curve is near zero.

13. A method according to claim 12 wherein the weighting coefficient for points below the smooth data signal is from about 1 to about 1¼, and the weighting coefficient for points above the smooth data signal is from about zero to about ½.

14. A method according to claim 11 wherein step (b) is repeated up to about 75 times.

15. A method according to claim 14 wherein step (b) is repeated about 5 to about 25 times.

16. A method according to claim 11 wherein step (e) is repeated about 5 to about 30 times.

17. A method according to claim 11 wherein step (e) is repeated about 10 to about 20 times.

18. A method according to claim 11 wherein the least squares approximation polynomials in step (a) are of first order or third order.

19. A method according to claim 11 wherein the least squares approximation polynomials in step (d) are of first order or third order.

20. A method according to claim 11 wherein the point being substituted in step (a) and in step (d) is a central point of the localized segment of consecutive data points.

21. A method according to claim 11 wherein each localized segment in step (a) comprises about five to about seven consecutive data points.

22. A method according to claim 11 wherein each localized segment in step (d) comprises about five to about nine consecutive data points.

23. A method for enhancing a neutron induced gamma ray spectral logging record, such data produced by bombarding a subterranean rock formation in situ with high energy neutrons from a pulsed neutron source and detecting at various intervals along the rock formation gamma radiation through a range of energies, such gamma radiation being induced by said bombardment, and recording on a record medium such detected radiation to produce the spectral logging record which includes for each depth interval recorded a signal component superimposed on a noise component, the signal component representing the numbers of counts of gamma radiation attributable to the presence of elements of interest in the rock formation, and the noise component comprising a portion attributable to compton scattering phenomena occurring in the rock formation, the method comprising:
  (1) for each depth interval recorded,
    (a) generating a baseline signal from the spectral record, such baseline signal representing the portion of the noise component attributable to compton scattering;
    (b) subtracting the baseline signal from the spectral record to generate a noise-reduced difference signal; and
  (2) assembling the noise-reduced difference signals for all intervals of interest to produce an enhanced spectral logging record.

24. A method for determining the abundances of elements of interest in a rock formation from in situ measurement, the method comprising:
  (1) bombarding a subterranean rock formation in situ by high energy neutrons from a pulsed neutron source and detecting at various intervals along the rock formation gamma radiation through a range of energies, such gamma radiation being induced by said bombardment;
  (2) recording on a record medium such detected radiation to produce raw spectral data which includes for each depth interval recorded a signal component representing the numbers of counts of gamma radiation attributable to the presence of elements of interest, superimposed on a noise component comprising a major portion attributable to compton scattering phenomena occurring in the rock formation;
  (3) for each depth interval recorded:
    (a) generating from the raw spectral data a baseline signal representing that portion of the noise component attributable to compton scattering;
    (b) subtracting the baseline signal from the spectral data to generate a noise-reduced difference signal which represents the numbers of counts of gamma radiation attributable to the presence of the elements of interest; and
    (c) calibrating the difference signal by comparing it to a difference signal of similar origin taken of a rock formation of known composition; and
    (d) determining from the calibrated difference signal the number of counts attributable to each element of interest to obtain the abundance of each such element in the recorded depth interval of the rock formation.

25. A method according to claim 24 where the number of counts attributable to each element of interest is determined by summing an area between a portion of the calibrated difference signal and the baseline signal.

26. A method according to claim 24 where the number of counts attributable to each element of interest is determined by ascertaining the height of each portion of the difference signal which is attributable to the elements of interest.

27. A method according to claim 24 where the high energy neutrons are monoenergetic when released from the neutron source.

28. A method for determining by in situ measurement the lithology of a rock formation of unknown composition through which a borehole has been drilled comprising:
  (1) producing a raw neutron induced gamma ray spectral log measuring the presence of particular elements at selected intervals of interest along the rock formation by:
    (a) bombarding the rock formation in situ with neutrons from a source in the borehole positioned successively at the intervals of interest;
    (b) detecting the emission of gamma radiation through a range of energies at such intervals of interest along the formation;
    (c) recording such detected emission on a record medium to produce the raw neutron induced gamma ray log which contains a signal component representing gamma radiation attributable to the particular elements, superimposed on a noise component including a portion attributable to compton scattering phenomena;
  (2) enhancing the raw neutron induced gamma ray log to produce a noise-reduced log by: for each recorded interval of interest:
    (a) filtering high-frequency noise from the raw neutron induced gamma ray log to provide a smooth data signal;
    (b) generating a baseline signal from the smooth data signal, such baseline signal representing the portion of the noise component of the raw neutron induced gamma ray log attributable to compton scattering;

(c) subtracting the baseline signal from the smooth data signal to produce a noise reduced log for the interval of interest measuring gamma radiation attributable to the particular elements in the rock formation;

(d) calibrating the noise reduced log by comparing it to a standardized noise reduced log of similar origin taken of a rock formation of known composition, to determine the abundances of the elements present at such interval;

(e) assigning an initial value of water saturation and of porosity to the formation at each interval of interest;

(f) using the measured abundances of the elements obtained in steps (a)–(d) and the values of water saturation and of porosity to derive amounts of selected minerals comprising mixtures of the elements present at the intervals;

(g) using the derived amounts of the selected minerals to correct the values of water saturation and of porosity;

(h) repeating steps (f) and (g) using the last corrected values of water saturation and porosity until such values converge within a selected limit, to determine, for each interval of interest, the composition of the rock formation including the presence of the selected minerals; and (i) assembling the compositions for the intervals to produce a lithological log of the subterranean rock formation.

29. A method according to claim 28 wherein the limit for water saturation is about 5%.

30. A method for determining by in situ measurement the lithology of a rock formation of unknown composition through which a borehole has been drilled comprising:

(1) producing a raw neutron induced gamma ray spectral log measuring the presence of particular elements at selected intervals of interest along the rock formation by:

(a) bombarding the rock formation in situ with neutrons from a source in the borehole positioned successively at the intervals of interest;

(b) detecting the emission of gamma radiation through a range of energies at such intervals of interest along the formation;

(c) recording such detected emission on a record medium to produce the raw neutron induced gamma ray log which contains a signal component superimposed on a noise component, the signal component representing gamma radiation attributable to the particular elements, and the noise component including a portion attributable to compton scattering phenomena;

(2) enhancing the raw neutron induced gamma ray log to produce a noise-reduced log by: for each recorded interval of interest:

(a) generating a baseline signal from the raw log, such baseline signal representing the portion of the noise component of the raw neutron induced gamma ray log attributable to compton scattering; and (b) subtracting the baseline signal from the smooth data signal to produce a noise reduced log for the interval of interest measuring gamma radiation attributable to the particular elements in the rock formation;

(c) calibrating the noise reduced log by comparing it to a standardized noise reduced log of similar origin taken of a rock formation of known composition, to determine the abundances of the elements present at such selected interval;

(d) assuming an initial value of water saturation and of porosity in the formation at each interval of interest;

(e) using the measured abundances of the selected elements obtained in steps (a)–(c) and the values of water saturation and of porosity to derive amounts of selected minerals comprising mixtures of the elements present at the intervals;

(f) using the derived amounts of the selected minerals to correct the values of water saturation and of porosity;

(g) repeating steps (e) and (f) using the last corrected values of water saturation and porosity until such values converge within a selected limit, to determine, for each interval of interest, the composition of the rock formation including the presence of the selected minerals; and (h) compiling the compositions for the intervals to produce a lithologic log of the subterranean rock formation.

31. A method for enhancing a neutron induced gamma ray spectral logging record, such data produced by bombarding a subterranean rock formation in situ with high energy neutrons from a pulsed neutron source and detecting at various intervals along the rock formation gamma radiation through a range of energies, such gamma radiation being induced by said bombardment, and recording on a record medium such detected radiation to produce the spectral logging record which includes for each depth interval recorded a single component superimposed on a noise component, the signal component representing the numbers of counts of gamma radiation attributable to the presence of elements of interest in the rock formation, and the noise component comprising a portion attributable to compton scattering phenomena occurring in the rock formation, the method comprising:

(a) reducing the noise component by eliminating the portion attributable to compton scattering; and (b) calibrating the noise reduced logging record.

32. A method according to claim 31 further comprising determining the numbers of counts attributable to individual elements from the calibrated record to produce a logging record indicating the abundances of such elements at the intervals.

* * * * *